United States Patent [19]

Doemens

[11] Patent Number: 4,863,280
[45] Date of Patent: Sep. 5, 1989

[54] INTEGRAL TEMPERATURE MEASUREMENT IN ELECTRICAL MACHINES, TRANSFORMERS AND ENERGY CONVERSION SYSTEMS

[75] Inventor: Guenter Doemens, Holzkirchen, Fed. Rep. of Germany

[73] Assignee: Siemens Aktiengesellschaft, Munich, Fed. Rep. of Germany

[21] Appl. No.: 193,674

[22] Filed: May 12, 1988

[30] Foreign Application Priority Data

Jun. 9, 1987 [DE] Fed. Rep. of Germany ....... 3719207
Jan. 28, 1988 [DE] Fed. Rep. of Germany ....... 3802529

[51] Int. Cl.⁴ ..................... G01K 11/24; G01K 11/22
[52] U.S. Cl. ................................... 374/119; 374/103; 374/117; 374/141; 374/152
[58] Field of Search ............... 374/103, 102, 119, 117, 374/152, 141, 137

[56] References Cited

U.S. PATENT DOCUMENTS

| | | | |
|---|---|---|---|
| 3,399,570 | 9/1968 | Pirlet | 374/117 |
| 3,595,082 | 7/1971 | Miller | 374/119 |
| 3,633,243 | 1/1972 | Bell | 374/117 |
| 3,878,502 | 4/1975 | Rochelle | 374/117 X |
| 3,999,433 | 12/1976 | Taplin | 374/117 |
| 4,249,418 | 2/1981 | Ebata | 374/117 |
| 4,416,552 | 11/1983 | Hessemer, Jr. et al. | 374/117 |
| 4,483,630 | 11/1984 | Vavela | 374/117 X |
| 4,623,264 | 11/1986 | Mitchell | 374/117 |
| 4,650,346 | 3/1987 | Tehon | 374/117 |
| 4,676,663 | 6/1987 | Tehon | 374/119 |
| 4,676,665 | 6/1987 | Twendochlib | 374/152 |
| 4,754,760 | 7/1988 | Fukukita et al. | 374/117 |

FOREIGN PATENT DOCUMENTS

| | | | |
|---|---|---|---|
| 0198732 | 10/1986 | European Pat. Off. | 374/117 |
| 3306529 | 8/1984 | Fed. Rep. of Germany | 374/117 |
| 1138668 | 2/1985 | U.S.S.R. | 374/119 |
| 1300159 | 12/1972 | United Kingdom | 374/117 |

*Primary Examiner*—William A. Cuchlinski, Jr.
*Assistant Examiner*—Diego F. F. Gutierrez
*Attorney, Agent, or Firm*—Hill, Van Santen, Steadman & Simpson

[57] ABSTRACT

Integral temperature measurement in electrical machines, transformers and energy conversion systems. An integral temperature measurement for electrical machines, transformers and energy conversion systems produces no additonal potential or voltage in the windings of such equipment. As a result, no conductive or semiconductive material can be used in a temperature sensor. The present invention utilizes the temperature dependency of the propagation conditions of sound or ultrasound in gases and also makes use of light waveguide technology. The sound or ultrasound is guided in a flexible capillary along a path along which an integral temperature measurement is to be taken.

19 Claims, 2 Drawing Sheets

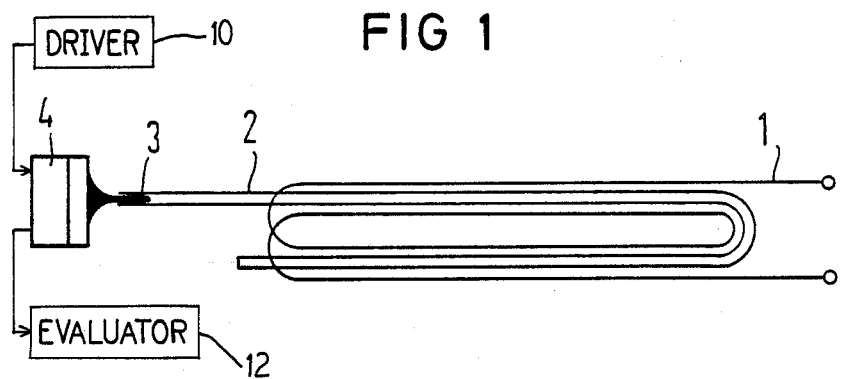
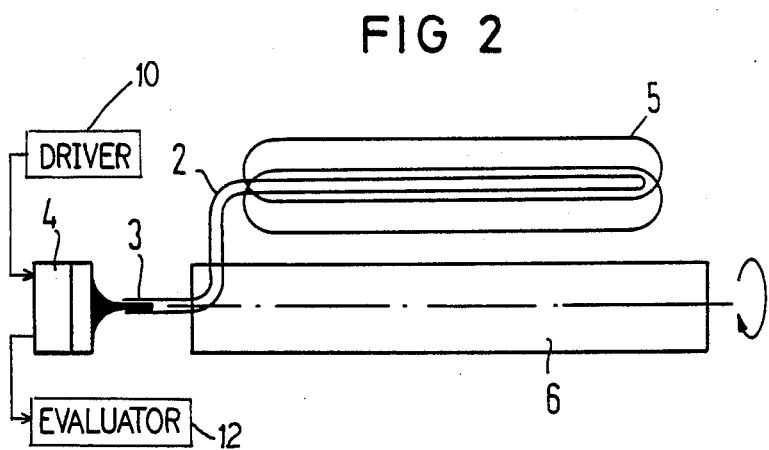

INTEGRAL TEMPERATURE MEASUREMENT IN ELECTRICAL MACHINES, TRANSFORMERS AND ENERGY CONVERSION SYSTEMS

BACKGROUND OF THE INVENTION

The invention is directed to integral temperature measurement in electrical machines, transformers and energy conversion systems by interpreting the temperature dependency of the propagation conditions of sound or ultrasound in gases. Energy conversion systems include gas turbines, internal combustion motors, heating systems, etc.

The winding temperature is a critical operating characteristic of electrical machines. A point temperature value is of less interest than an integral, mean temperature indication over the entire winding. A continuous, automatic monitoring of this characteristic would represent a decisive advance in the operating reliability of electrical machines.

Until now, the integral temperature of the stator winding was obtained by a resistance measurement of the copper windings. The separation of the power circuit and the test circuit, however, results in a considerably complex circuit so that a mass-produced integration of this measuring method in standard machines is not economically feasable. No measuring methods are known for the integral temperature measurement of the rotor winding.

SUMMARY OF THE INVENTION

An object of the present invention is to provide an integral temperature measurement as set forth above. An important condition for this type of temperature measurement is that no additional potentials or voltages occur in the windings due to the presence of a temperature sensor. Therefore, no conductive or semiconductive materials can be used in the temperature sensor. As a result all standard temperature measuring methods cannot be used.

According to the present invention, a sound or ultrasound wave is sent via a capillary into a region, for example the winding region of electrical machines to be measured, and a wave emerging is then received from the region. The integral temperature is mesured on the basis of a change in running time or, on the basis of a phase shift.

The invention makes it possible to measure the integral temperature in a rotating system in non-contacting fashion from a single stationary point. The only precondition is that the rotational shaft be accessible from at least one side.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a schematic illustration of a stator winding having glass fiber and an ultrasound transmitter/receiver; and FIG. 2 is a schematic illustration of rotor winding having a corresponding arrangement.

DESCRIPTION OF THE PREFERRED EMBODIMENT

Figure 3:
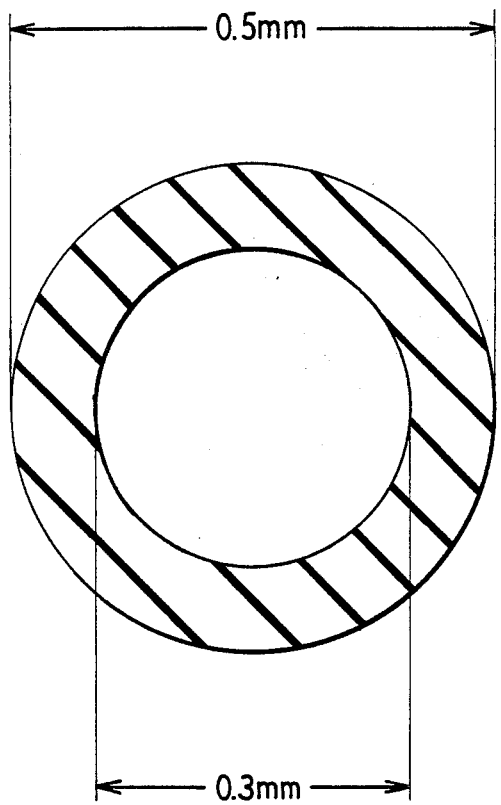
FIG. 3 is a cross-sectional view of a capillary used in the FIGS. 1 and 2 embodiment.

In FIG. 1, a stationary winding 1, for example a stator winding is schematically illustrated. A flexible capillary 2, for example a hollow glass fiber, is laid within a winding bundle. In the exemplary embodiment, an open end 3 of the glass fiber is connected to a combined ultrasound transmitter/receiver 4. The transmitter/receiver 4 is connected to a driver means 10 and an evaluator means 12, respectively, for measurement of the integral winding temperature as set forth below.

FIG. 2 differs from FIG. 1 only insofar as the indicated winding is a rotor winding bundle 5 in which the glass fiber 2 is laid. The open glass fiber end 3 emerges centrally at the butt end of a shaft 6 and surrounds the transmitter/receiver in freely mobile fashion for coupling sound in and out of the transmitter/receiver.

The figures do not show that the capillary 2 is filled with a solid body between the transmitter/receiver 4 and entry into the measuring path, so that the temperature measurement is not influenced proceeding from this region.

The integral temperature measurement on which the invention is based utilizes the temperature dependency of the propagation speed c of ultrasound in gases ($c \sim \sqrt{T}$) and also utilizes light waveguide technology. A sound signal or an ultrasound signal is thereby conducted in a hollow glass fiber or plastic capillary (outside diameter about 0.5 mm; inside diameter about 0.3 mm, see FIG. 3) and the glass fiber is laid along the conductors of the winding. The employment of glass fibers guarantees a high mechanical stability and flexibility as well as a good temperature resistance. Given a change in temperature along the winding, a change in travel time or a change in phase shift of the ultrasound results and is measurable with a simple electronic means or evaluator 12 and results in a direct, precise and unambiguous measurement of the integral winding temperature via the relationship $c \sim \sqrt{T}$.

Expediently, the glass fiber has its other end closed in a reflecting fashion and the sound or, respectively, ultrasound transmitter is simultaneously used as receiver.

At the same time, this sound, or, respectively ultrasound technique provides a solution to the problem of integral temperature measurement of rotating rotor windings. To that end, the hollow glass fiber or plastic capillary is likewise laid along the rotor winding and one end provided for coupling the sound is axially conducted out at the butt end of the rotor (FIG. 2) where the stationary transmitter/receiver connects into the fiber end in non-contacting fashion or where the fiber end surrounds the transmitter/receiver in freely rotatable fashion.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Integral temperature measurement of electrical machines, transformers and energy conversion systems having at least one winding by interpreting the temperature dependency of the propagation conditions of sound or ultrasound in gases, comprising the sound or ultrasound being conducted in a capillary along a path along which the integral temperature over the entire winding is to be measured from a change in travel time or phase shift, the capillary being a flexible glass fiber being composed of an electrically insulating material and being laid in at least one loop along the winding thereby defining a measuring region.

2. Temperature measurement according to claim 1, wherein the capillary is composed on an insulating material and wherein a sound transmitter is located adjacent one end of the capillary and outside of the measuring region and a sound receiver is located adjacent at the other end outside of the measuring region; and wherein the transmitter and receiver are connected via a means for interpreting the phase shift or travel time.

3. Integral temperature measurement according to claim 1, wherein the capillary is composed of an insulating material and is closed at one end which is reflective; and wherein a sound transmitter simultaneously serves as receiver and is located adjacent the other end of the capillary and outside of the measuring region.

4. Integral temperature measurement according to claim 2, wherein the capillary is a glass fiber that has an outside diameter of about 0.5 mm and an inside diameter of about 0.3mm.

5. Integral temperature measurement according to claim 1, wherein the sound or the ultrasound in the capillary is guided in a solid member up to its entry into the region to be measured.

6. Integral temperature measurement of electrical machines, transformers and energy conversion systems by interpreting the temperature dependency of the propagation conditions of sound or ultrasound in gases, comprising the sound or ultrasound being conducted in a capillary along a path along which the integral temperature is to be measured from a change in travel time or phase shift, and for measurement of rotor windings on a shaft, the end of the capillary, provided for coupling sound in, being conducted axially out at a butt end of the shaft.

7. Integral temperature measurement of electrical machines, transformers and energy conversion systems by interpreting the temperature dependency of the propagation conditions of sound or ultrasound in gases, comprising the sound or ultrasound being conducted in a capillary along a path along which the integral temperature is to be measured from a change in travel time or phase shift, and an end of the capillary being coupled to a sound transmitter/receiver in a freely rotatable fashion.

8. A method of measuring integral temperature of electrical machines, transformers and energy conversion systems having at least one winding by interpreting the temperature dependency of the propagation of sound in a gas comprising:
conducting a sound in a flexible, glass fiber capillary filled with the gas along a path, the path being at least in a measuring region in which the integral temperature over the entire winding is to be measured, said measuring region being defined by said capillary being laid in at least one loop along said at least one winding; and
determining the integral temperature from a change in the propagation of the sound.

9. The method according to claim 8, wherein the capillary is composed of an insulating material and wherein a sound transmitter is located adjacent one end of the capillary and a sound receiver is located adjacent the other end of the capillary, the sound transmitter and the sound receiver being outside of the measuring region.

10. The method according to claim 9, wherein the sound receiver and the sound transmitter are connected to a means for determining the integral temperature from the change in propagation of the sound along the path.

11. The method according to claim 8, wherein the sound is an ultrasound.

12. The method according to claim 8, wherein the change in propagation of the sound is a change in travel time along the path.

13. The method according to claim 8, wherein the change in propagation of the sound is a change in phase shift of the sound in the path.

14. The method according to claim 8, wherein the winding is a stator winding.

15. The method according to claim 8, wherein the winding is a rotor winding.

16. The method according to claim 8, wherein the capillary is composed of an insulating material and wherein a sound transmitter/receiver is located adjacent one end of the capillary and outside of the measuring region, the other end of the capillary being closed and also being reflective.

17. A method of measuring integral temperature of electrical machines, transformers and energy conversion systems by interpreting the temperature dependency of the propagation of sound in a gas comprising:
conducting a sound in a capillary filled with the gas along a path, the path being at least in a measuring region in which the integral temperature is to be measured;
determining the integral temperature from a change in the propagation of the sound; and
the measuring region being a rotor winding on a shaft and an end of the capillary provided for coupling sound at least into the capillary being conducted axially out at a butt end of the shaft.

18. A method of measuring integral temperature of electrical machines, transformers and energy conversion systems by interpreting the temperature dependency of the propagation of sound in a gas comprising:
conducting a sound in a capillary filled with the gas along a path, the path being at least in a measuring region in which the integral temperature is to be measured;
determining the integral temperature from a change in the propagation of the sound; and
an end of the capillary being coupled to a transmitter/receiver in a freely rotatable fashion.

19. The method according to claim 18, wherein the sound in the capillary is guided in a solid member between the sound transmitter/receiver and the measuring region.

* * * * *